United States Patent Office 2,857,473
Patented Oct. 21, 1958

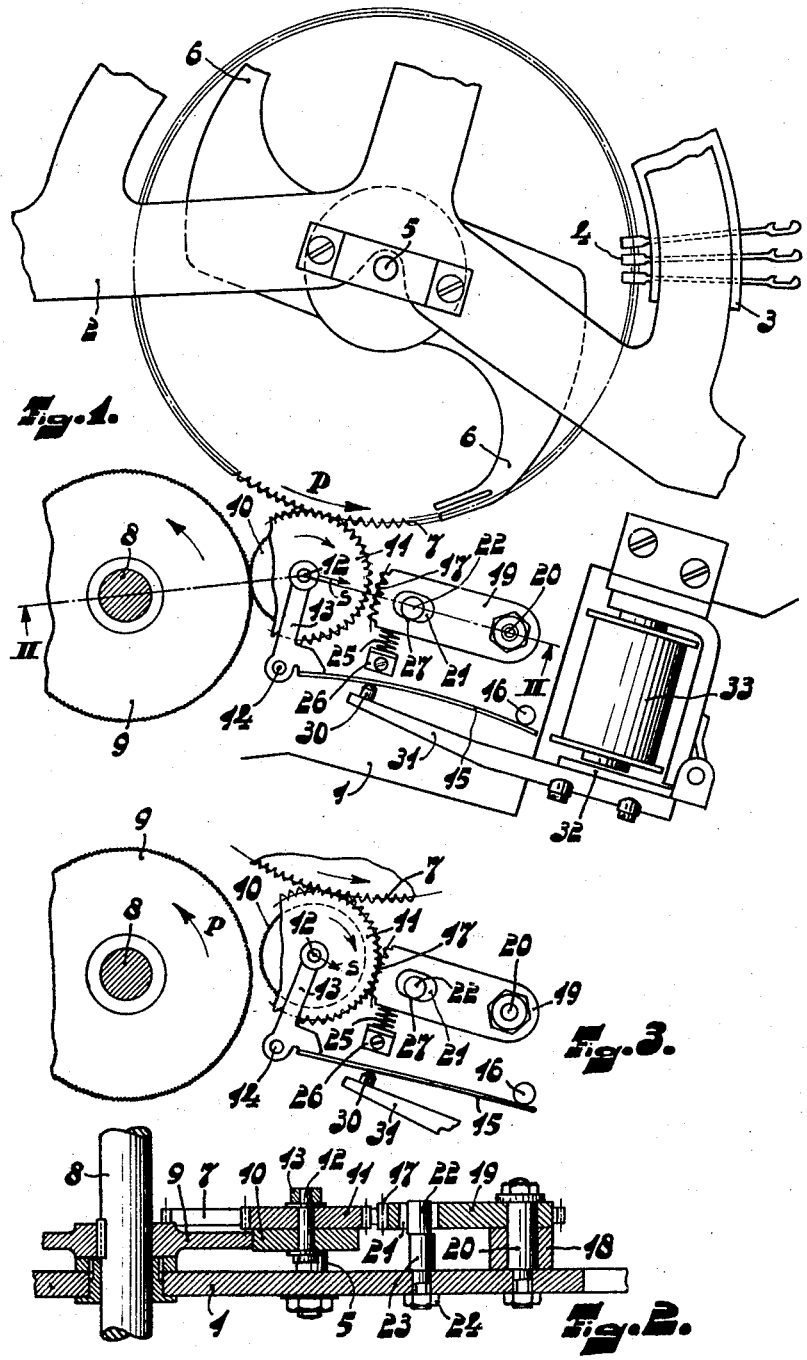

2,857,473

SELECTOR COMPRISING A WIPER CARRIAGE WHICH IS DRIVEN THROUGH A DISENGAGEABLE COUPLING

Reinhard Cornelis Greve, Hilversum, Netherlands, assignor, by mesne assignments, to North American Philips Company, Inc.

Application September 13, 1955, Serial No. 534,113

Claims priority, application Netherlands September 13, 1954

4 Claims. (Cl. 179—27.51)

The invention relates to selectors, more particularly selectors for use in automatic telephone systems, comprising a wiper carriage which is adapted to be moved over the fixed contacts and to be stopped in a number of contact positions and which through a coupling member adapted to be displaced by means of an electromagnet can be alternately coupled to a continuously rotating driving shaft and to a stop member which is secured to the frame of the selector.

In a known selector of the kind described the coupling member is mounted on a shaft which is coupled to the wiper carriage so as to be adapted to be displaced in the direction of its length but is not rotatable with respect to that shaft. In the driving position a conical end of the coupling member co-operates with a conical friction wheel mounted on the driving shaft. By means of an electromagnet the coupling member can be displaced in a manner such that the coupling to the driving shaft is interrupted and the other end of the coupling member is urged against a brake cushion which is secured to the frame of the selector.

It is an object of the invention to provide a selector of the kind described in the preamble in which compared with the known construction, other things being equal, during stopping a lower velocity of the coupling member with respect to the stop member is produced, thus permitting of a higher velocity of the wiper carriage.

According to the invention the coupling member is rotatably supported from an arm which is adapted to be displaced at right angles to the axis of said member and consists of at least two rigidly interconnected co-axial wheels one of which together with a driving wheel on the driving shaft constitutes a coupling which is adapted to be disengaged and another of which is a gear-wheel which is continuously meshed with a gear-wheel which is coupled to the wiper carriage and the axis of which is parallel to that of the coupling member, the direction of displacement of the axis of the coupling member to effect a disengagement of the coupling to the driving shaft, corresponding with the direction of movement of that part of the gear-wheel coupled to the wiper carriage which is meshed with the coupling member. As a result of the agreement in direction of movement of the axis of the coupling member and of that part of the gear-wheel coupled to the wiper carriage which is meshed with said member during the movement of the coupling member towards the stop member, the rotational velocity of the coupling member is reduced so that the impact upon contact with the stop member is reduced and the direction of the impact is less tangential.

Preferably the stop member comprises teeth which co-operate with a toothed part of the coupling member, which toothed part may be identical with the gear-wheel which is continuously meshed with the gear-wheel which is coupled to the wiper carriage. Preferably the coupling member, the stop member and the various other wheels consist of linear superpolyamides (nylon). This material is not only resilient and resistant to wear but also of light weight and acts as a damper so that in stopping the impact is reduced.

An embodiment of the invention will now be described more fully with reference, by way of example, to the accompanying drawing, in which—

Fig. 1 is a diagrammatic plan view of a rotary selector when driven,

Fig. 2 is a cross-sectional view taken along the line II—II of Fig. 1, and

Fig. 3 is a plan view of the position of the coupling member when the wiper carriage is stopped.

The selector shown in the figures comprises a frame plate 1 and a frame portion 2 between which a contact bank 3 comprising fixed contacts 4 is arranged. A wiper carriage (not shown) comprising wipers 6 is adapted to rotate about a shaft 5 which is journalled centrally of the frame plate 1 and the frame portion 2. To the wiper carriage a gear-wheel 7 is connected which in the position shown in Figures 1 and 2 is driven in the direction of the arrow P by a shaft 8 which is in constant rotation and passes through the frame plate 1. The movement is transmitted by means of a coupling member adapted ot rotate about a spindle 12, which coupling member consists of a coupling wheel 10 and a gear-wheel 11 which is rigidly secured thereto. The rim of the coupling wheel 10 is continuously pressed against a driving wheel 9 mounted on the shaft 8, while the gear-wheel 11 is continuously meshed with the gear-wheel 7. The wheels 10 and 11 which may be united both consist of linear superpolyamides (nylon). The coupling wheel 10 and the driving wheel 9 made from the same material have milled rims comprising teeth which are approximately 0.4 mm. high and approximately three of which are provided per mm. of the circumference.

The spindle 12 is secured in an arm 13 which is adapted to pivot about a pin 14 provided on the frame plate 1. The arm 13 has a leaf spring 15 connected to it the free end of which is urged to a pin 16 which is fixed in the frame plate 1. The spring 15 ensures that in the normal position of the selector the arm 13 is spaced away from the driving shaft 8 so that the coupling wheel 10 no longer engages the driving wheel 9 and the gear wheel 11 co-operates with a toothed rim 17 of a stop member 19 in order to stop the wiper carriage. This position is shown in Fig. 3. The elongated stop member 19 bears upon a support 18 and is adapted to pivot about a pin 20 which is rigidly secured in the frame plate 1. Between the pivot point and the toothed rim 17 the stop member 19 comprises an elongated aperture 21 into which an eccentric circular end 22 of a pin 23, which is screwed in the frame plate 1, extends. The pin 23 can be locked in any position it may occupy by means of a nut 24. The width of the aperture 21 slightly exceeds the diameter of the end 22 of the pin. By means of a compression spring 25 one end of which bears against a corner piece 26 secured to the frame 1 while the other end engages the side of the stop member 19 the edge 27 of the aperture 21 is kept pressed against the end 22.

The spring 15 co-operates with a pin 30 arranged at the end of an arm 31 which is secured to an armature 32 of an electromagnet 33. When the magnet 33 is energized, the armature 32 is attracted so that it presses the pin 30 to the leaf spring 15 in a manner such that the arm 13 viewed from above as in Figures 1 and 3 is pivoted to the left, as a result of which the gear wheel 11 becomes disengaged from the toothed edge 17 of the stop member 19 and the coupling wheel 10 has its milled edge urged against the driving wheel 9. This position is shown in Figures 1 and 2. Thus, the wiper carriage is driven in the direction P as has been mentioned hereinbefore.

When the wiper carriage has assumed the desired contact position, the energisation of the electromagnet 33 is interrupted so that the armature 32 is released and the spring 15 restores the arm 13 and the wheels 10 and 11 to the normal rest position. The spindle 12 of the wheels 10 and 11 is moved in the direction S which corresponds to the direction P of that part of the rim of the gear-wheel 7 which meshes with the gear-wheel 11. This agreement in direction of movement results in that the rotation velocity of the gear-wheel 11 is reduced so that at the instant at which the teeth of the gear-wheel 11 mesh with the teeth of the stop member 19 the relative velocity of these teeth is less than corresponds to the normal rotational speed of the gear wheel 11. This permits of a high speed of the wiper carriage with little risk of an incorrect stop position. The impact which is produced when the gear-wheel 11 engages the toothed edge 17 of the stop member 19 is absorbed resiliently on the one hand by the compression spring 25 and on the other by the material of the gear-wheel 11 and the stop member 19. Similarly to the gear-wheel 7 these parts consist of linear superpolyamides (nylon), which are resilient, damping and of light weight so that the inertia forces are kept small. The compression spring 25 is strong enough to return the stop member 19 against the stop 22 after the wiper carriage has been stopped. Consequently, the stop position of the wiper carriage is accurately determined by the position of the stop member 19 and this position is adjustable by means of the screw 23.

In order to assist in the engagement of the teeth of the gear-wheel 11 and the toothed edge 17 said teeth are pointed and have curved flanks. This tooth shape has the additional advantage that even if the instant of engagement the teeth do not register complementarily, correct engagement and consequently a satisfactory position of the wiper carriage are produced.

What is claimed is:

1. A selector for automatic telephone systems including a wiper carriage comprising a continuously rotating driving shaft having a driving wheel, a plurality of fixed contacts, said wiper carriage being provided with a gear wheel and movable over the fixed contacts and selectively arrested for engagement therewith, a coupling member including at least two rigidly interconnected co-axial wheels, one of which co-acts with the driving wheel of the driving shaft and an arm displaceable at right angles to the axis of the coupling member rotatably supporting said coupling member, a stop member, electromagnetic means for displacing said arm whereby in one position said coupling member is coupled to said continuously rotating driving shaft and in another position coupled to said stop member, said coupling member including a gear wheel which is continually meshed with the gear wheel of the carriage, and the direction of displacement of the axis of the coupling member to effect disengagement of the coupling member from the driving shaft corresponds to the direction of movement of the gear wheel of the wiper carriage meshed with the other of said wheels of the coupling member.

2. A selector as set forth in claim 1 wherein the axis of the coupling member is substantially parallel to the driving shaft.

3. A selector as set forth in claim 1 wherein said stop member is provided with teeth which co-act with one of the wheels of the coupling member to arrest the movement of said wiper carriage.

4. A selector as set forth in claim 1 wherein said stop member includes means mounting said stop member for limited movement in the direction of movement of the co-acting wheel of said coupling member, and resilient means connected to said stop member for resisting the movement of said stop member in one direction and returning the same to the normal position after said movement in one direction has ceased.

References Cited in the file of this patent

UNITED STATES PATENTS

| 2,662,936 | Unk et al. | Dec. 15, 1953 |
| 2,701,238 | Droel | Feb. 1, 1955 |